(12) United States Patent
Shiraishi

(10) Patent No.: US 8,149,480 B2
(45) Date of Patent: Apr. 3, 2012

(54) IMAGE FORMING APPARATUS AND METHOD FOR CALIBRATION SCHEDULING BASED ON HOUR-BY-HOUR AND DAY-OF-WEEK USE FREQUENCY

(75) Inventor: Mitsuo Shiraishi, Ushiku (JP)

(73) Assignee: Canon Kabushiki Kaisha (JP)

( * ) Notice: Subject to any disclaimer, the term of this patent is extended or adjusted under 35 U.S.C. 154(b) by 245 days.

(21) Appl. No.: 11/870,203

(22) Filed: Oct. 10, 2007

(65) Prior Publication Data

US 2008/0088891 A1    Apr. 17, 2008

(30) Foreign Application Priority Data

Oct. 11, 2006  (JP) .................................. 2006-277798

(51) Int. Cl.
*H04N 1/46* (2006.01)
(52) U.S. Cl. ........... 358/504; 358/406; 358/1.1; 358/1.9
(58) Field of Classification Search .................. 358/504, 358/406, 1.1, 1.9
See application file for complete search history.

(56) References Cited

U.S. PATENT DOCUMENTS

| | | | |
|---|---|---|---|
| 5,321,478 A * | 6/1994 | Nakamura et al. ............... 399/70 |
| 2003/0214657 A1* | 11/2003 | Stringham ...................... 358/1.1 |
| 2004/0032605 A1* | 2/2004 | Regimbal ...................... 358/1.13 |
| 2007/0177232 A1* | 8/2007 | Takeuchi ...................... 358/504 |

FOREIGN PATENT DOCUMENTS

| | | |
|---|---|---|
| JP | 8-9178 A | 1/1996 |
| JP | 2005-122341 A | 5/2005 |
| JP | 2006-220846 A | 8/2006 |

OTHER PUBLICATIONS

Office action issued in corresponding Japanese Patent Application 2006-277798 dated Aug. 2, 2011.

* cited by examiner

*Primary Examiner* — Benny Tieu
*Assistant Examiner* — Paul F Payer
(74) *Attorney, Agent, or Firm* — Rossi, Kimms & McDowell LLP

(57) ABSTRACT

An image forming apparatus which is capable of increasing printing efficiency by simplifying the calibration operation in time zones during which the frequency of use of the apparatus is high. An image forming apparatus has a plurality of calibration modes set in advance on a time zone-by-time zone basis for operating days. A printer controller determines a day of week and time of day, and selects one of the calibration modes associated with the day of week and time of day. The controller performs cumulative counting of sheets color-printed after a preceding calibration, and determines whether or not calibration in the selected calibration mode should be executed, from a cumulative count value of color-printed sheets and the selected calibration mode. The calibration in the selected calibration mode is executed in response to the determination that the calibration should be executed.

4 Claims, 8 Drawing Sheets

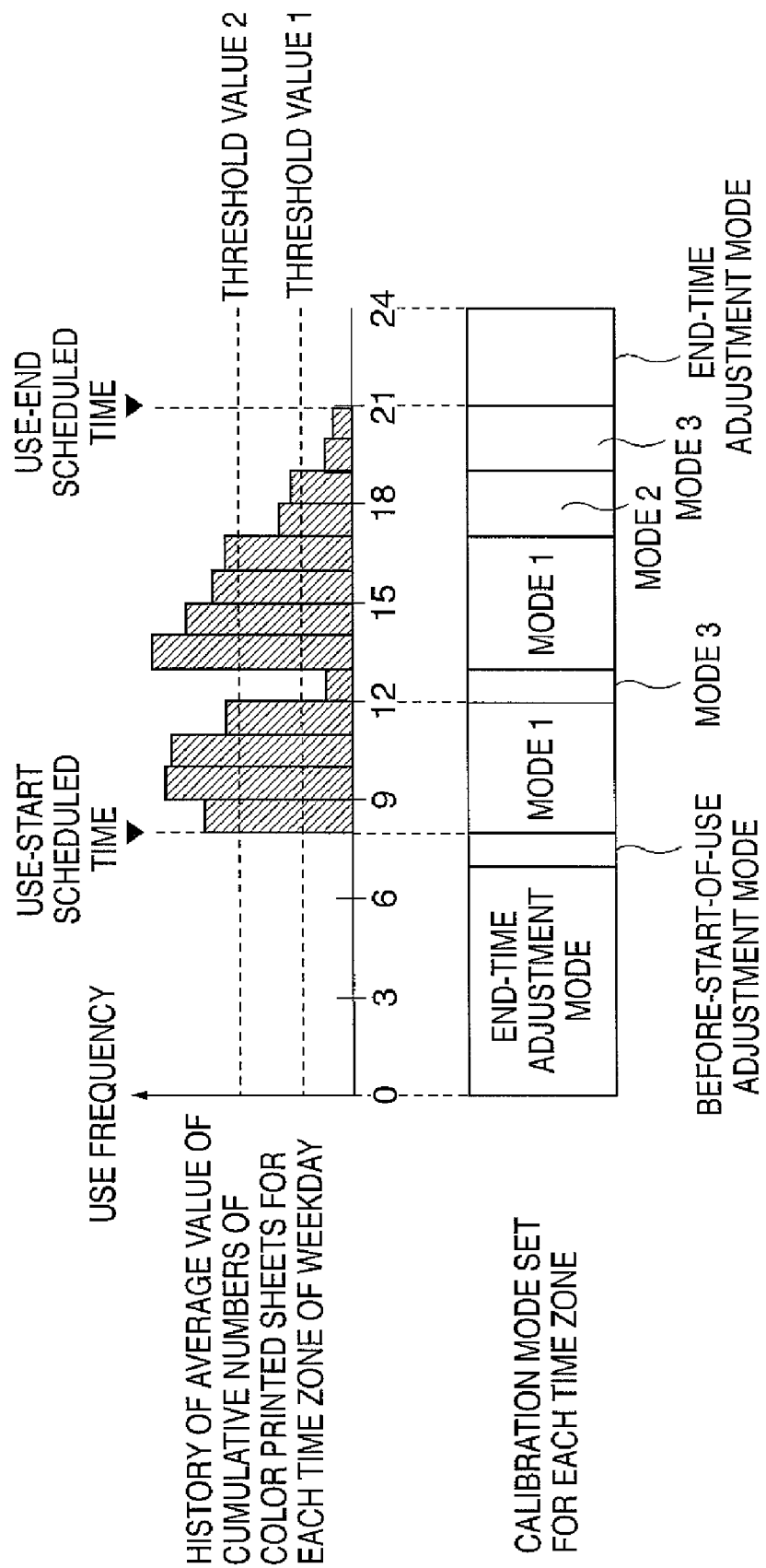

FIG. 4

| CALIBRATION | SELECTION | CONDITION | MODE 1 | MODE 2 | MODE 3 | BEFORE-USE-ONLY | AFTER-USE-ONLY |
|---|---|---|---|---|---|---|---|
| POTENTIAL CONTROL | LEVEL 1 | THREE-POINT SAMPLING | ○ | | | / | / |
| | LEVEL 2 | FIVE-POINT SAMPLING | | ○ | | / | / |
| | LEVEL 3 | SEVEN-POINT SAMPLING | | | ○ | ○ | ○ |
| PRIMARY TRANSFER CURRENT ADJUSTMENT | LEVEL 1 | THREE-POINT SAMPLING | ○ | | | / | / |
| | LEVEL 2 | FIVE-POINT SAMPLING | | ○ | | / | / |
| | LEVEL 3 | SEVEN-POINT SAMPLING | | | ○ | ○ | ○ |
| SECONDARY TRANSFER CURRENT ADJUSTMENT | LEVEL 1 | THREE-POINT SAMPLING | ○ | | | / | / |
| | LEVEL 2 | FIVE-POINT SAMPLING | | ○ | | / | / |
| | LEVEL 3 | SEVEN-POINT SAMPLING | | | ○ | ○ | ○ |
| MAXIMUM DENSITY ADJUSTMENT | LEVEL 1 | EVERY 200 COLOR-PRINTED SHEETS | ○ | | | UNCONDITIONAL | UNCONDITIONAL |
| | LEVEL 2 | EVERY 300 COLOR-PRINTED SHEETS | | ○ | | | |
| | LEVEL 3 | EVERY 400 COLOR-PRINTED SHEETS | | | ○ | | |
| COLOR TONE ADJUSTMENT | LEVEL 1 | NOT EXECUTED | ○ | | | / | / |
| | LEVEL 2 | 5 PATCHES | | ○ | | / | ○ |
| | LEVEL 3 | 9 PATCHES | | | ○ | ○ | / |
| TONER REPLENISHMENT AMOUNT CORRECTION | LEVEL 1 | EVERY 20 COLOR-PRINTED SHEETS | ○ | | | UNCONDITIONAL | UNCONDITIONAL |
| | LEVEL 2 | EVERY 30 COLOR-PRINTED SHEETS | | ○ | | | |
| | LEVEL 3 | EVERY 40 COLOR-PRINTED SHEETS | | | ○ | | |
| COLOR SHIFT ADJUSTMENT | LEVEL 1 | NOT EXECUTED | ○ | | | UNCONDITIONAL | / |
| | LEVEL 2 | EVERY 200 COLOR-PRINTED SHEETS | | ○ | | | / |
| | LEVEL 3 | EVERY 400 COLOR-PRINTED SHEETS | | | ○ | | / |
| | | | SELECTABLE | | | NOT FOR SELECTION | PARTIALLY SELECTABLE |

IMAGE FORMING APPARATUS AND METHOD FOR CALIBRATION SCHEDULING BASED ON HOUR-BY-HOUR AND DAY-OF-WEEK USE FREQUENCY

BACKGROUND OF THE INVENTION

1. Field of the Invention

The present invention relates to an image forming apparatus, such as a color copying machine, a color laser printer, or a color LED printer, and a control method therefor, as well as a program for implementing the method and a storage medium.

2. Description of the Related Art

In the image forming apparatus of the above-mentioned type, it is necessary to cope with various environmental changes (aging of components, the amount of used toner, the number of printed sheets, etc.) to continue outputting of each of the same full-color images with the same tints of colors. To this end, whenever a predetermined time period elapses or certain conditions are satisfied, immediately before carrying out printing (immediately after reception of print data) or during printing of a plurality of pages, an operation, which is called calibration, referred to hereinafter, is executed for color density adjustment, color drift correction, etc.

Techniques related to the calibration are disclosed e.g. in Japanese Laid-Open Patent Publications (Kokai) No. H08-9178 and No. 2005-122341.

Calibration is essential for printing full-color images. However, the execution of calibration at a fixed repetition period or on the same conditions, there arises the following inconveniences:

Even during printing (during execution of printing of a plurality of sheets) in a time zone during which the printing frequency is high, calibration is executed, which compels the user who has started printing has to wait for completion of printing for a longer time period than it should be, which degrades efficiency of printing.

Further, even in the time zone during which the frequency of use of the image forming apparatus is high, the details of calibration and the time period over which calibration is executed are the same, which compels users to wait more often as the printing frequency is higher.

Further, the image forming apparatus has a sleep mode and an energy-saving mode, and there can be a case in which after returning from the sleep mode or the energy-saving mode, calibration is executed only after printing several sheets, which degrades efficiency of printing (image formation).

Further, to avoid the use of an image forming apparatus that executes a calibration operation, there have been proposed e.g. a technique of allocating print data to other image forming apparatuses. This technique, however, does not provide a solution to users who have only one image forming apparatus.

SUMMARY OF THE INVENTION

The present invention provides an image forming apparatus and a control method therefor which are capable of increasing printing efficiency by simplifying the calibration operation in time zones during which the frequency of use of the apparatus is high, and a program for implementing the method and a storage medium.

In a first aspect of the present invention, there is provided an image forming apparatus that has a plurality of calibration modes set in advance on a time zone-by-time zone basis for operating days, comprising a day-of-week/time-of-day-determining unit that determines a day of week and time of day, a selection unit that selects one of the calibration modes associated with the day of week and time of day determined by the day-of-week/time-of-day-determining unit, a counting unit that performs cumulative counting of sheets subjected to color printing after a preceding calibration, a calibration execution-determining unit that determines whether or not calibration in the calibration mode selected by the selection unit should be executed, from a cumulative count value of sheets subjected to color printing counted by the counting unit and the calibration mode selected by the selection unit, and a calibration execution unit that executes the calibration in the calibration mode selected by the selection unit, in response to the determination by the calibration execution-determining unit that the calibration should be executed.

The image forming apparatus according to the first aspect of the present invention has a plurality of calibration modes set in advance on a time zone-by-time zone basis for operating days, and comprises a day-of-week/time-of-day-determining unit that determines a day of week and time of day, and a selection unit that selects a calibration mode. Further, the image forming apparatus has a counting unit that performs cumulative counting of sheets subjected to color printing after a preceding calibration. The apparatus also includes a calibration execution-determining unit that determines whether or not calibration in the calibration mode should be executed, from the cumulative count value of color-printed sheets and the selected calibration mode. Further, the image forming unit includes a calibration execution unit that executes the calibration in the selected calibration mode.

Thus, the image forming apparatus executes calibration while switching the calibration mode according to expected printing circumstances in which users use the apparatus and the frequency of use of the apparatus. Therefore, it is possible to execute a simplified calibration operation during time zones during which the frequency of use of the apparatus is high to thereby increase printing efficiency.

The image forming apparatus can further comprise a standby state-determining unit that determines whether or not the image forming apparatus is in standby before a use-start scheduled time, and a before-use-only calibration execution unit that executes the calibration in a before-use-only calibration mode when a predetermined time period elapses if the image forming apparatus is in standby before the use-start scheduled time.

The image forming apparatus can further comprise an elapsed time-determining unit that determines whether or not a predetermined time period has elapsed after printing executed last time, when it becomes a use-end scheduled time, a sleep mode/energy-saving mode shift-determining unit that determines whether or not the image forming apparatus has shifted to a sleep mode or an energy-saving mode, if the predetermined time period has elapsed, a sleep mode/energy-saving mode execution unit that executes the sleep mode or the energy-saving mode if the image forming apparatus has shifted to the sleep mode or the energy-saving mode, and an end-time-only calibration execution unit that executes an end-time-only calibration if the image forming apparatus has not shifted to the sleep mode or the energy-saving mode.

The image forming apparatus can further comprise a calibration rank-determining unit that determines whether or not the calibration mode selected after a predetermined time period has elapsed after use of the image forming apparatus is of a highest rank for maintaining an image quality, an immediately preceding calibration rank-determining unit that determines whether or not the calibration mode of the calibration executed on an immediately preceding occasion is of the highest rank, if the calibration mode selected after the predetermined time period has elapsed after the use of the image forming apparatus is of the highest rank, and a control unit that causes the end-time-only calibration execution unit to execute the end-time-only calibration if the calibration mode selected after the predetermined time period has elapsed after the use of the image forming apparatus is not of the highest rank, and causes the sleep mode/energy-saving mode execution unit to execute the sleep mode or the energy-saving mode, if the calibration mode selected after the predetermined time period has elapsed after the use of the image forming apparatus is of the highest rank.

In a second aspect of the present invention, there is provided a method of controlling an image forming apparatus that has a plurality of calibration modes set in advance on a time zone-by-time zone basis for operating days, comprising a day-of-week/time-of-day-determining step of determining a day of week and time of day, a selection step of selecting one of the calibration modes associated with the day of week and time of day determined in the day-of-week/time-of-day-determining step, a counting step of performing cumulative counting of sheets subjected to color printing after a preceding calibration, a calibration execution-determining step of determining whether or not calibration in the calibration mode selected in the selection step should be executed, from a cumulative count value of sheets subjected to color printing counted in the counting step and the calibration mode selected in the selection step, and a calibration execution step of executing the calibration in the calibration mode selected in the selection step, in response to the determination in the calibration execution-determining step that the calibration should be executed.

In a third aspect of the present invention, there is provided a program for causing a computer to execute a method of controlling an image forming apparatus that has a plurality of calibration modes set in advance on a time zone-by-time zone basis for operating days, comprising a day-of-week/time-of-day-determining module for determining a day of week and time of day, a selection module for selecting one of the calibration modes associated with the day of week and time of day determined by the day-of-week/time-of-day-determining module, a counting module for performing cumulative counting of sheets subjected to color printing after a preceding calibration, a calibration execution-determining module for determining whether or not calibration in the calibration mode selected by the selection module should be executed, from a cumulative count value of sheets subjected to color printing counted by the counting module and the calibration mode selected by the selection module, and a calibration execution module for executing the calibration in the calibration mode selected by the selection module, in response to the determination by the calibration execution-determining module that the calibration should be executed.

In a fourth aspect of the present invention, there is provided a storage medium storing the program according to the third aspect of the present invention.

The features and advantages of the invention will become more apparent from the following detailed description taken in conjunction with the accompanying drawings.

BRIEF DESCRIPTION OF THE DRAWINGS

FIG. 3 is a view showing an example of a graph of average values of cumulative counts of times of execution of color printing calculated by performing addition every one hour at a weekday, and calibration modes in respective time zones which are set according to the average values of the cumulative counts.

FIG. 4 is a configuration table for configuring the calibration modes in FIG. 3.

DETAILED DESCRIPTION OF THE PREFERRED EMBODIMENTS

The present invention will now be described in detail below with reference to the accompanying drawings showing preferred embodiments thereof.

Figure 1:
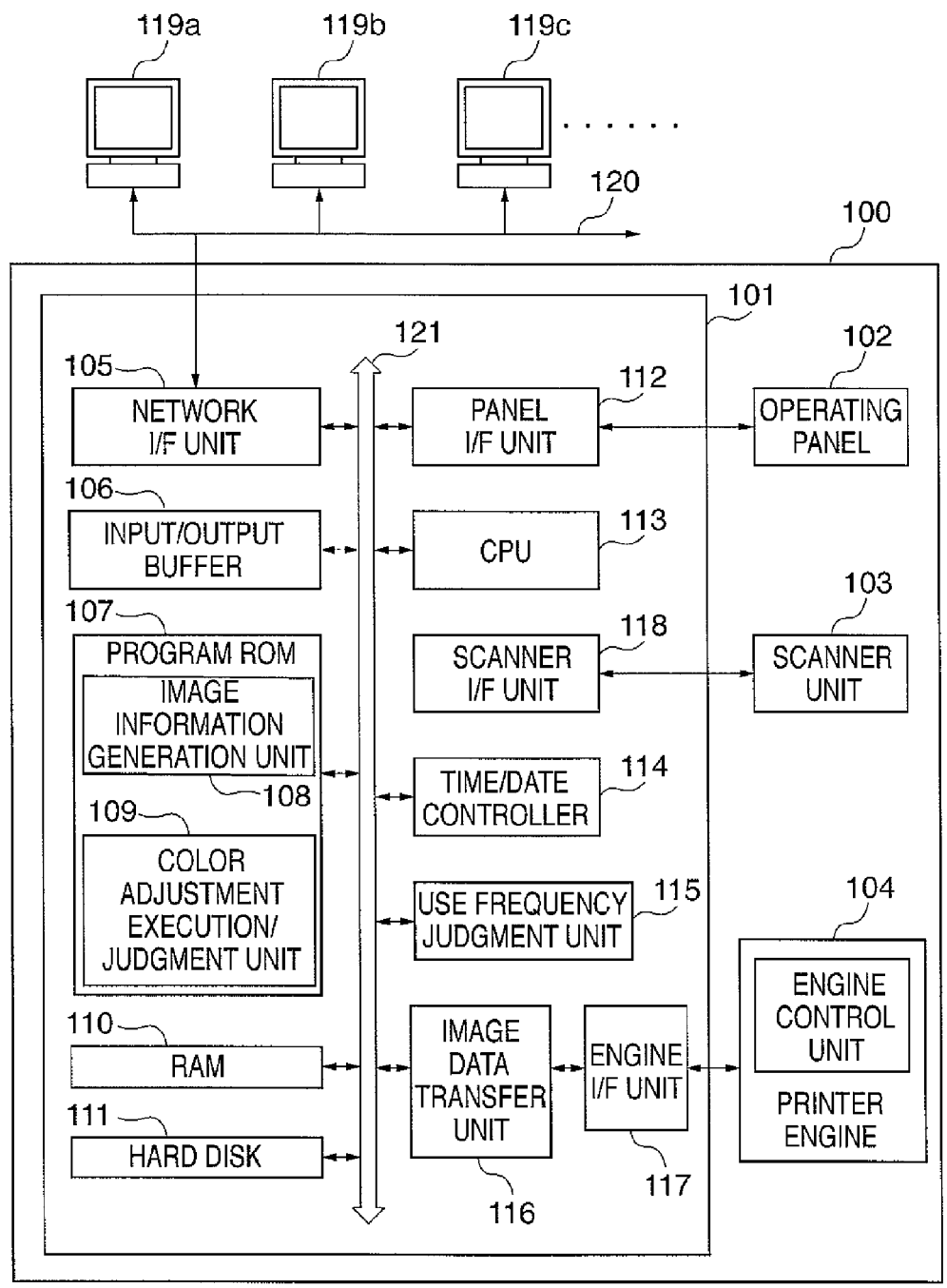
FIG. 1 is a functional block diagram of an image forming apparatus according to an embodiment of the present invention.

FIG. 1 is a schematic block diagram of an image forming apparatus according to a first embodiment of the present invention.

As shown in FIG. 1, a color laser printer 100 as the image forming apparatus is connected to a plurality of computers 119 (119a, 119b, and 119c) via a network 120.

The color laser printer 100 is comprised of a printer controller 101, an operation panel 102, a scanner unit 103, and a printer engine 104 including an engine control unit.

The printer controller 101 is equipped with an input/output buffer 106 for performing transmission and reception of a control code and data to and from communication means, via a network I/F unit 105 responsible for the communication with the computers 119 connected to the network 120. Further, the printer controller 101 also includes a CPU 113 that controls the overall operation of the printer controller 101, and a program ROM 107 that stores programs describing operations to be executed by the CPU 113. The program ROM 107 includes an image information generation unit 108 that generates various image objects based on settings of data received from the computer 119 on the network 120, and a color adjustment execution/judgment unit 109 that executes color adjustment and judgment concerning the color adjustment.

Further, the printer controller 101 also includes a RAM 110 (volatile memory) that is used as a work memory for interpretation of control codes and data, computation necessary for printing, and processing of print data, and is also used for temporary storage of data.

Further, the printer controller 101 includes a hard disk 111 that is used for purposes similar to those of the RAM 110, and stores information on the values of count of printed sheets and so forth, a panel I/F unit 112 that is connected to the operation panel 102, and the CPU 113. The printer controller 101 also includes a time/date controller 114 that continues operation even after the power of the color laser printer 100 is shut down, using a power source, such as a battery, not shown.

Further, the printer controller 101 is equipped with a use frequency judgment unit 115 that judges whether each item of image data to be printed is of a color image or of a monochrome image, cumulatively adds up counts of printed sheets on a hour-by-hour basis and a day of week-by-day of week basis, and stores results of cumulative addition in the hard disk 111. The printer controller 101 also includes an image data transfer unit 116 that converts an image object into a bitmap, and transfers the converted bitmap image data to the printer engine 104.

Further, the printer controller 101 includes an engine I/F unit 117 that is connected to the printer engine 104, a scanner I/F unit 118 that receives image data input from the scanner unit 103, and a system bus 121 connecting the units.

Figure 2:
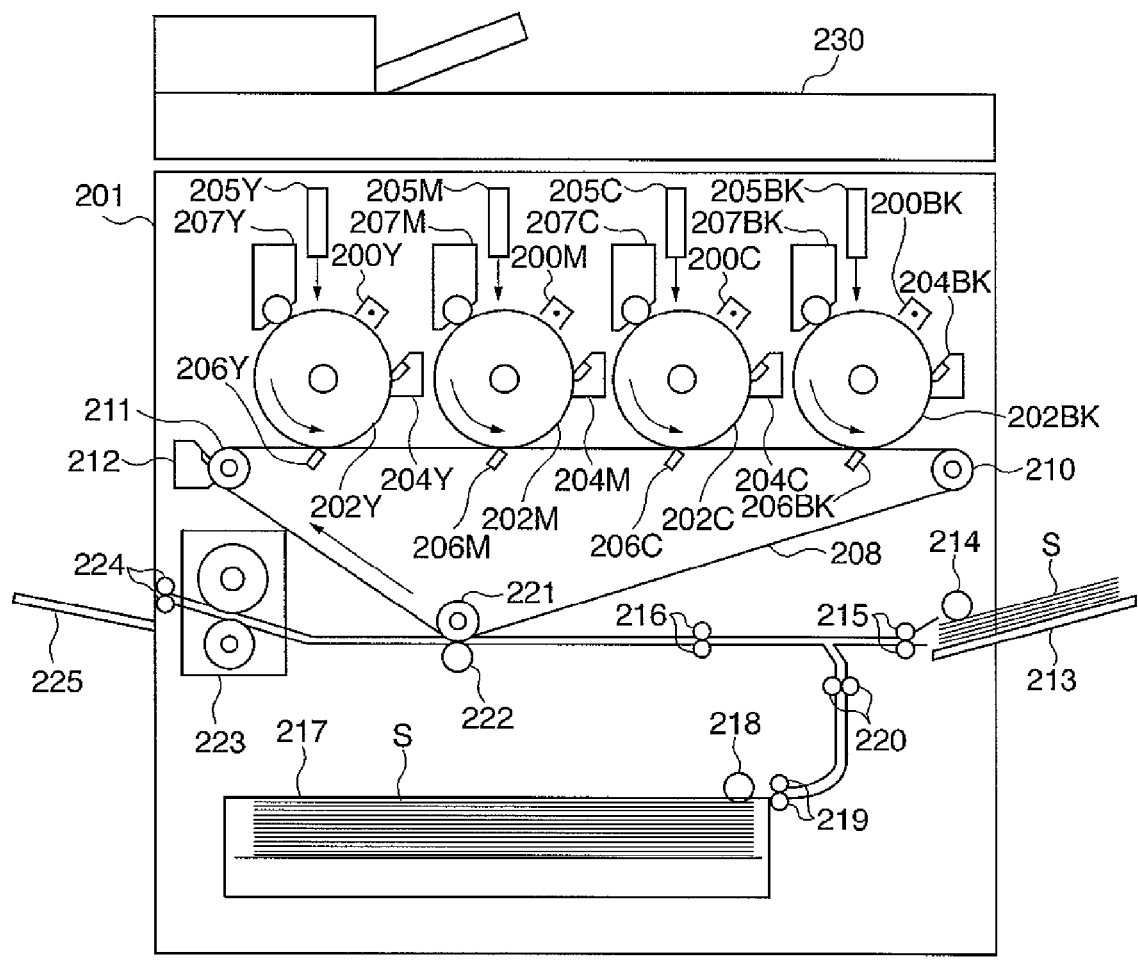
FIG. 2 is a schematic view of the image forming apparatus according to the embodiment of the present invention.

FIG. 2 is a schematic view of the image forming apparatus according to the embodiment of the present invention.

As shown in FIG. 2, the color laser printer as the image forming apparatus includes a printer main unit 201, and an image reading unit 230.

The printer main unit 201 includes four color photosensitive drums 202Y, 202M, 202C, and 202BK, chargers 203Y, 203M, 203C, and 203BK, and cleaners 204Y, 204M, 204C, and 204BK. Further, the printer main unit 201 also includes laser scanning units 205Y, 205M, 205C, and 205BK, and transfer blades 206Y, 206M, 206C, and 206BK, and developing units 207Y, 207M, 207C, and 207BK.

Further, the printer main unit 201 includes an intermediate transfer belt 208, rollers 210 and 211 supporting the intermediate transfer belt 208, a cleaner 212 for the intermediate transfer belt 208, a manual feeding tray 213 having recording sheets S received therein, and pickup rollers 214 and 215 for the tray 213.

Further, the printer main unit 201 includes a registration roller pair 216, a sheet feeding cassette 217, and pickup rollers 218 and 19. It also includes a vertical path roller pair 220, a rotation roller 221, a secondary transfer roller 222, a fixing unit 223, a sheet discharging roller pair 224, and a stacking tray 225.

In the color laser printer configured as described above, electrostatic latent images are formed on the color photosensitive drums 202Y, 202M, 202C, and 202BK, by the respective laser scanning units 205Y, 205M, 205C, and 205BK using a semiconductor laser as a light source. The electrostatic latent images are developed into toner images by the respective developing units 207Y, 207M, 207C, and 207BK.

The four color toner images developed on the photosensitive drums 202Y, 202M, 202C, and 202BK are collectively transferred onto a recording sheet at the secondary transfer roller 222, by intermediate transfer means including the intermediate transfer belt 208. The toner image on the recording sheet is fused by the fixing unit 223 onto the recording sheet to form a permanent image.

On the other hand, each recording sheet S is supplied from the sheet feeding cassette 217, the manual feeding tray 213, or the like, and is supplied to the second transfer roller 222 while having its registration timing controlled by the registration roller pair 216. In doing this, the pickup rollers 218 and 291 for feeding sheets from the sheet feeding cassette 217, the vertical path roller pair 220, the registration roller pair 216, the pickup rollers 214 and 125 for feeding sheets from the manual feeding tray 213, and other sheet feeding-related units perform a stable high-speed sheet feeding operation. To realize the stable high-speed sheet feeding operation, the rollers are driven by respective stepper motors independent of each other.

FIG. 3 is a view showing an example of a graph of average values of cumulative counts of times of execution of color printing calculated by performing addition every one hour at a weekday, and calibration modes in respective time zones which are set according to the average values of the cumulative counts.

The use frequency judgment unit 115 appearing in FIG. 1 counts a cumulative number of color-printed sheets on a day of week-by-day of week basis and on an hour-by-hour basis, and calculates an average number of sheets printed during each hour of each day of the week in the past. The graph in FIG. 3 shows the results of the calculation.

Threshold values 1 and 2 in the FIG. 3 graph represent judgment levels with reference to which a calibration mode is set for each time zone. In time zones during which the average value does not reach the threshold value 1 (12:00 to 13:00 and 19:00 to 21:00 in the illustrated example), the calibration mode is set to Mode 3. Further, in time zones during which the average value is between the threshold value 1 and the threshold value 2 (17:00 to 19:00 in the illustrated example), the calibration mode is set to Mode 2. In time zones during which the average value is above the threshold value 2, the calibration mode is set to Mode 1.

Within a range of service time from a use-start scheduled time (08:00) to a use-end scheduled time (21:00) in FIG. 3, the calibration mode is selected according to the use frequency per hour as described above. Further, the calibration mode is set to modes other than Modes 1 to 3, when it is outside the range of service time.

First, the user sets the use-start scheduled time and the use-end scheduled time and stores the settings in the printer. The printer controller 101 automatically returns to a standby mode in a time zone before the use-start scheduled time, and starts a calibration operation such that the calibration is completed before the use-start scheduled time.

The calibration executed before the use-start scheduled time is a before-use-only calibration specially intended for precise adjustment of colors and the like. Time after the use-end scheduled time to a next before-start-of-use adjustment mode in which the before-use-only calibration is to be executed is a section during which an end-time-only calibration is to be executed.

In a time period set to an end-time adjustment mode during which the end-time-only calibration is to be executed, when a predetermined time period (e.g. 30 minutes) has passed after a final printing operation by the user, the printer is caused to shift to a sleep mode. In the sleep mode, electric power is supplied only to component parts of the printer controller 101 requiring the supply of electric power, but almost all electric power supply is turned off to reduce the power consumption in a state waiting for use thereof.

A calibration to be executed before shifting to the sleep mode is set to the use-end-only calibration specially intended for precise adjustment of the printer at the end of the service time.

FIG. 4 is a configuration table for configuring the calibration modes in FIG. 3.

In the example illustrated in FIG. 4, the number of types (items) of calibration is set to be seven in total. Of course, the number of types of calibration can be varied depending on the specification of the image forming apparatus as a manufactured product.

The seven types of calibration executed according to the present embodiment are as follows:

(1) Potential control for stabilizing the charged potential of the photosensitive drums and the potential of electrostatic latent images caused by exposure to laser (2) Primary transfer current adjustment for adjusting transfer current for transferring toner images formed on the photosensitive drums dot by dot onto the intermediate transfer belt 208 in FIG. 2

(3) Secondary transfer current adjustment for adjusting secondary transfer current for transferring a toner image formed on the intermediate transfer belt 208 by primary transfer, onto a recording sheet (4) Maximum density adjustment for detecting a density level of a maximum density toner patch formed on the intermediate transfer belt 208 and adjusting the level of a developing bias to be supplied to the developing unit (5) Color tone adjustment for forming color tone patches having different densities of colors on the intermediate transfer belt and detecting the densities of the patches to thereby carry out correction of parameters used in color tone processing of image data (6) Toner replenishment amount correction for detecting toner densities of toner images formed on the intermediate transfer belt, estimating the amounts of toners in the respective developing units, and adjusting the amounts of toners supplied thereto.

(7) Color shift adjustment for correcting color shift

Each type of calibration has three levels, and the user or service person is capable of selecting one of the levels when configuring each mode.

First, for the calibration for potential control, at Level 1, three-point sampling is carried out in which measurement is performed under the conditions of three charge levels set for each charger and three levels also set for the amount of exposure laser light. At Level 2, five-point sampling is carried out, and at Level 3, seven-point sampling is carried out.

For the calibrations for the primary transfer current adjustment and the secondary transfer current adjustment, at Level 1, under respective conditions of three points set to transfer current, measurement of respective values of transfer voltage is performed for correction. At Level 2, measurement for correction is performed under the respective conditions of five points, and at Level 3, the same is performed under the respective conditions of seven points.

For the calibration for maximum density correction, timing for executing maximum density correction is varied according to the number of color-printed sheets. In the FIG. 4 configuration, at Level 1, the calibration for the maximum density correction is executed when the cumulative number of color-printed sheets counted from the use-start scheduled time reaches 200. At Level 2, the calibration is executed when 300 is reached, and at Level 3, when 400 is reached.

For the calibration for color tone correction, the number patches of tones of each color formed on the intermediate transfer belt is varied with level. At Level 2, the number of respective patches for tones is five, and at Level, that of respective patches for tones is 9. Further, at Level 1, the color tone correction is inhibited from being executed.

For the calibration for toner replenishment amount correction, timing for executing toner replenishment amount correction is varied with the number of color-printed sheets. At Level 1, the calibration for tone replenishment amount is executed when the cumulative number of color-printed sheets reaches 20. At Level 2, the same is executed when 30 is reached, and at Level 3, when 40 is reached.

For the calibration for color shift correction as well, timing for executing the color shift correction is varied according to the number of color-printed sheets. At Level 2, the calibration for color shift correction is executed when the cumulative number of color-printed sheets reaches 200. At Level 3, the same is executed when 400 is reached. Further, at Level 1, the color shift correction is inhibited from being executed.

Next, a description will be given of a calibration mode in which above-mentioned types of calibration are set in combination. In Mode 1, the potential control, the primary transfer current adjustment, the secondary transfer current adjustment, the color tone correction, and the color shift adjustment are each set to Level 1, and the maximum density correction and the toner replenish amount correction are each set to Level 3.

As is apparent from FIG. 3, Mode 1 is configured such that the time period required for completion of the calibration and the frequency of execution thereof are reduced to the minimum, considering a higher frequency of color printing operation by the user, to thereby minimize the delay of print job caused by the calibration.

In contrast, in Mode 3, the potential control, the primary transfer current adjustment, the secondary transfer current adjustment, the color tone correction, and the color shift correction are each set to Level 2, and the maximum density correction and the toner replenishment correction are each set to Level 1. As is understood from the FIG. 3 graph, the calibration in this mode is executed during a time zone in which the frequency of use of the printer is low, and by making use of the time zone, the adjustments and corrections are executed more precisely and more correctly to thereby enable the color printer to maintain the quality of images printed thereby.

Further, Mode 2 is set for the adjustments and corrections of intermediate levels between Mode 1 and Mode 3. Further, Modes 1 to 3 can be each configured by the user or the service person.

On the other hand, for the before-use-only calibration, each type of calibration is set to be not selectable by the user or service person, and for the after-use-only (end-time-only) calibration, some types of calibration (only color tone correction in FIG. 4) are set to be selectable. This is because before putting the printer into service for the day, precise adjustments are desirably executed to make always appropriate the quality of images formed by the color laser printer, and hence all types of calibration selected here are executed before the use of the printer.

Further, the after-use-only (end-time-only) calibration is configured such that all types of calibration other than the color shift correction are executed. The calibration, detailed types of which are set according to Mode 1, Mode 2, Mode 3, the before-use-only calibration, and the after-use-only (end-time-only) calibration configured as in FIG. 4, is set and executed for each time zone as shown in FIG. 3. It should be noted that as will be described in detail hereinafter with reference to FIG. 8, the after-use-only calibration is not only executed after the use-end scheduled time, but it can be also executed when the printer has been idle for 15 minutes or longer after the printing was executed last time in the range of service time.

Figure 5:
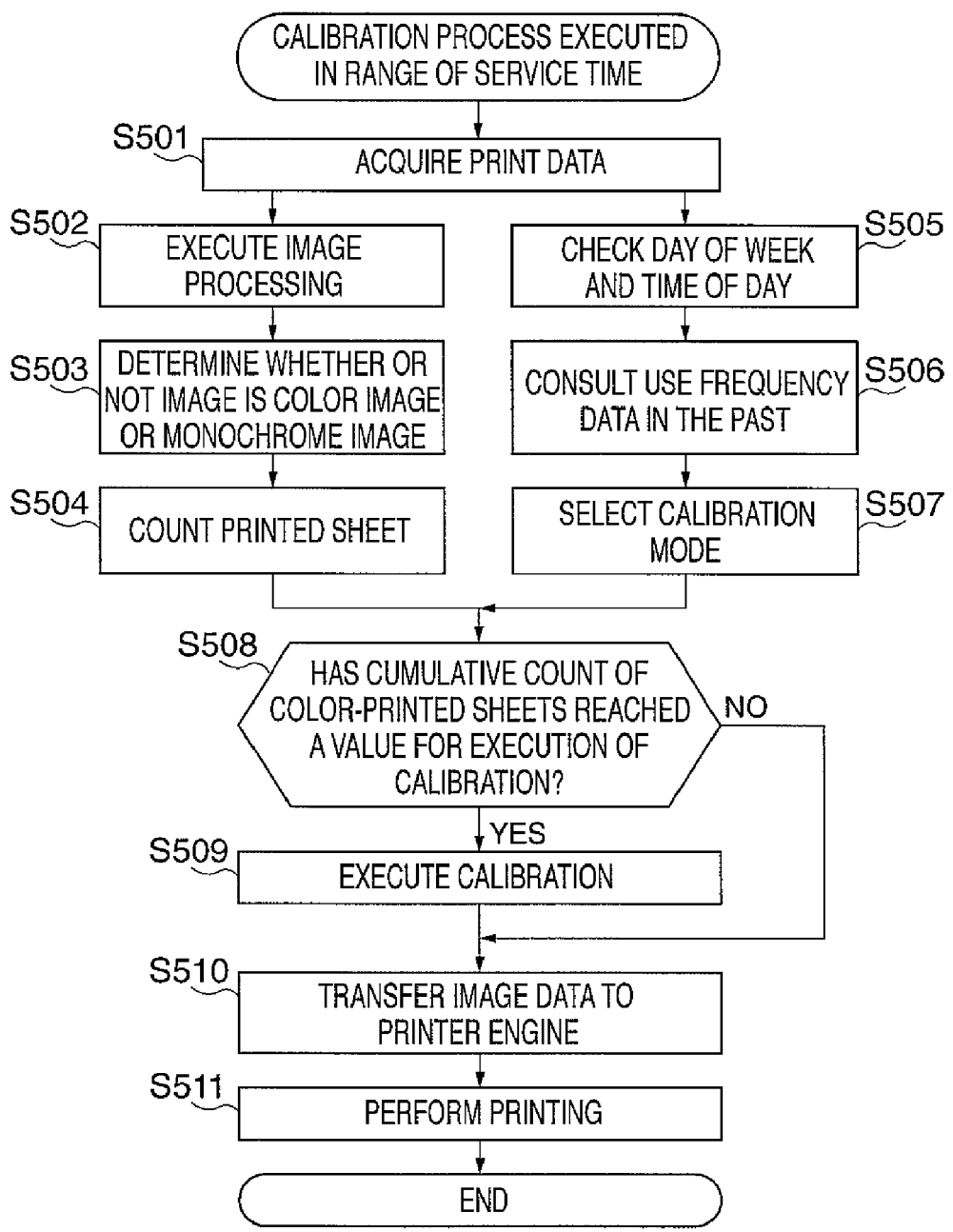
FIG. 5 is a flowchart of a calibration process executed by the image forming apparatus appearing in FIG. 1 within a range of service time.

FIG. 5 is a flowchart of a calibration process executed by the FIG. 1 image forming apparatus within the range of service time.

This process is executed by the printer controller 101 appearing in FIG. 1.

The present process is started upon inputting of an instruction for starting printing by the computer 119 connected to the printer via the network 120, or by the operation panel 102.

Referring to FIG. 5, first, acquisition of print data is executed, and image data to be printed is input (step S501). The image processing is executed on the input image data for printing (step S502). Next, it is determined whether or not the image is a color image or a monochrome image (step S503).

After determining whether the image is a color image or a monochrome image, counting of printed sheets is executed (step S504). Here, there are executed the counting of the cumulative number of color printed sheets or the cumulative number of monochrome printed sheets, on a day of week-by-day of week basis, and on an hour-by-hour basis, and the counting of the cumulative number of sheets color-printed after execution of the preceding calibration operation.

Further, after acquisition of print data (S501), in parallel with the image processing (step S502), a sequence of checking the day of week and time of day is executed (step S505). Next, from the use frequency data in the past stored in the hard disk 111, data of the same day of week and time of day is read out (step S506).

The data read by the sequence in the step S506 is used in a next sequence of calibration mode selection (step s507) so as to select a calibration mode according to the frequency of use of the printer (step S507).

Next, it is determined whether or not the calibration is to be executed according to the selected calibration mode (step S508). More specifically, the cumulative count of color-printed sheets calculated in the step S504 is compared with each of associated ones of predetermined reference values set according to respective levels set to the types (items) of calibration in the selected calibration mode to determine whether the calibration (required items of calibration) should be executed in the selected calibration mode. In this step S508, if it is determined that it is not necessary to execute the calibration, the process proceeds to a step S510, wherein the image data is transferred to the printer engine 104, to perform printing (step S511), followed by terminating the present process.

If it is determined in the step S508 that it is required to execute the calibration, the required items of calibration in the selected calibration mode is executed (step S509), and the process proceeds to the aforementioned step S510.

Figure 6:
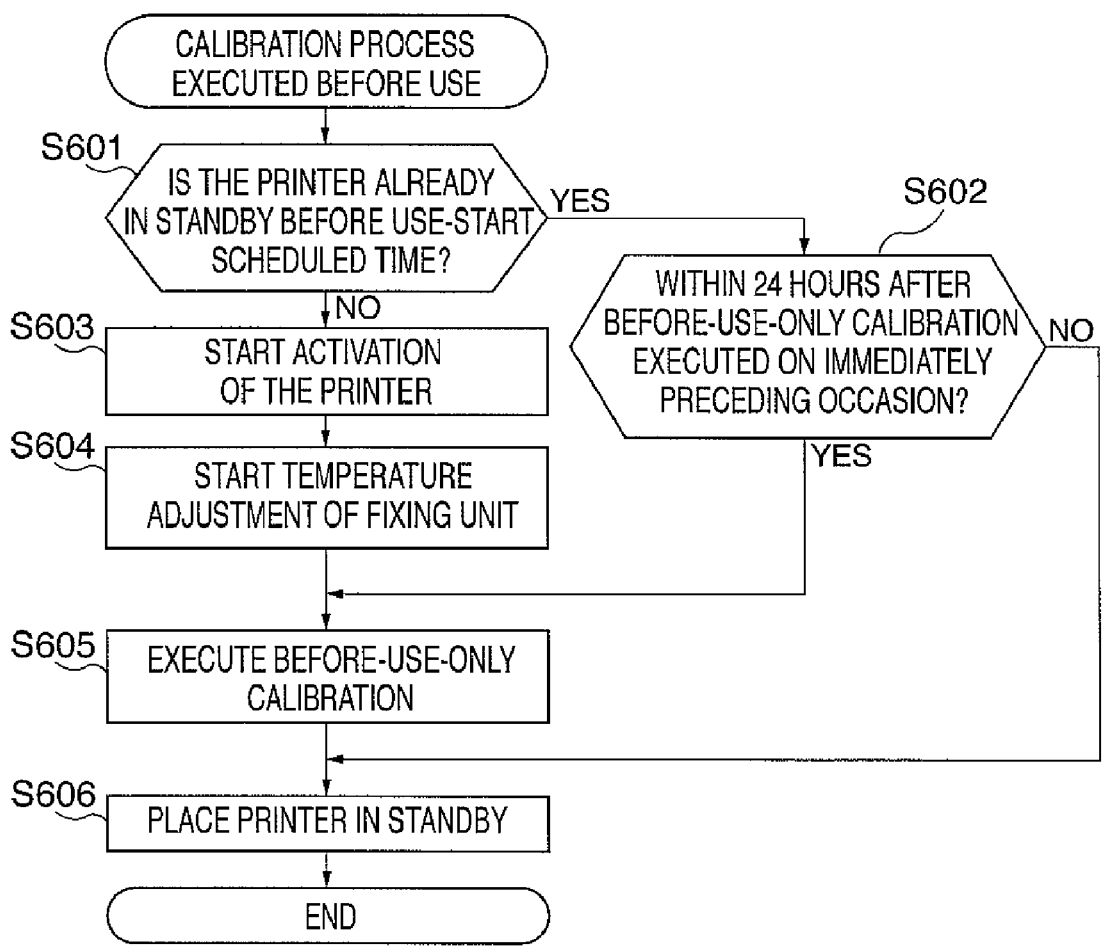
FIG. 6 is a flowchart of a calibration process executed by the FIG. 1 image forming apparatus, before the start of use thereof.

FIG. 6 is a flowchart of a calibration process executed by the FIG. 1 image forming apparatus, before the start of use thereof.

This process is executed by the printer controller 101 appearing in FIG. 1.

When the use-start scheduled time set by the user is approaching, the printer controller 101 recognizes the fact, and starts the present process.

In FIG. 6, first, it is determined whether or not the printer is already in standby before the use-start scheduled time (step S601). If the printer is in standby at this time point, it is determined whether or not it is within 24 hours after the before-use-only calibration executed on the immediately preceding occasion (step S602).

The time zone during which the before-use-only calibration is set, as shown in FIG. 3, to one hour period before the use-start scheduled time. Therefore, if the user turned on the printer before the period and keeps the same in standby, the printer can be in standby without executing the before-use-only calibration, and hence the determination in the step S602 is carried out.

The before-use-only calibration is a sequence required to recognize the state of the printer more precisely to thereby maintain the printer always in an appropriate condition. This sequence is provided for preventing the printer from continuing to be used without executing the calibration.

If it is determined in the step S602 that the before-use-only calibration was executed within 24 hours, the process proceeds to a step S606, wherein the printer is placed in standby, followed by terminating the present program.

If, it is determined in the step S602 that it is necessary to execute the calibration, i.e. that 24 hours have passed after execution of the preceding operation of the before-use-only calibration, this calibration is executed (step S605), and the process proceeds to the step S606, wherein the printer is placed in standby.

If it is determined in the step S601 that the printer in the sleep mode and hence not in standby, the activation of the printer is started (step S603). When the printer activation is started, first, the temperature adjustment of the fixing unit 223 is started (step S604), and the temperature adjustment is continued until the temperature of the fixing unit 223 becomes equal to or higher than a predetermine temperature. Upon completion of the adjustment, the process proceeds to the step S605, wherein the before-use-only calibration is executed, and then the printer is causes to shift to the standby state.

Figure 7:
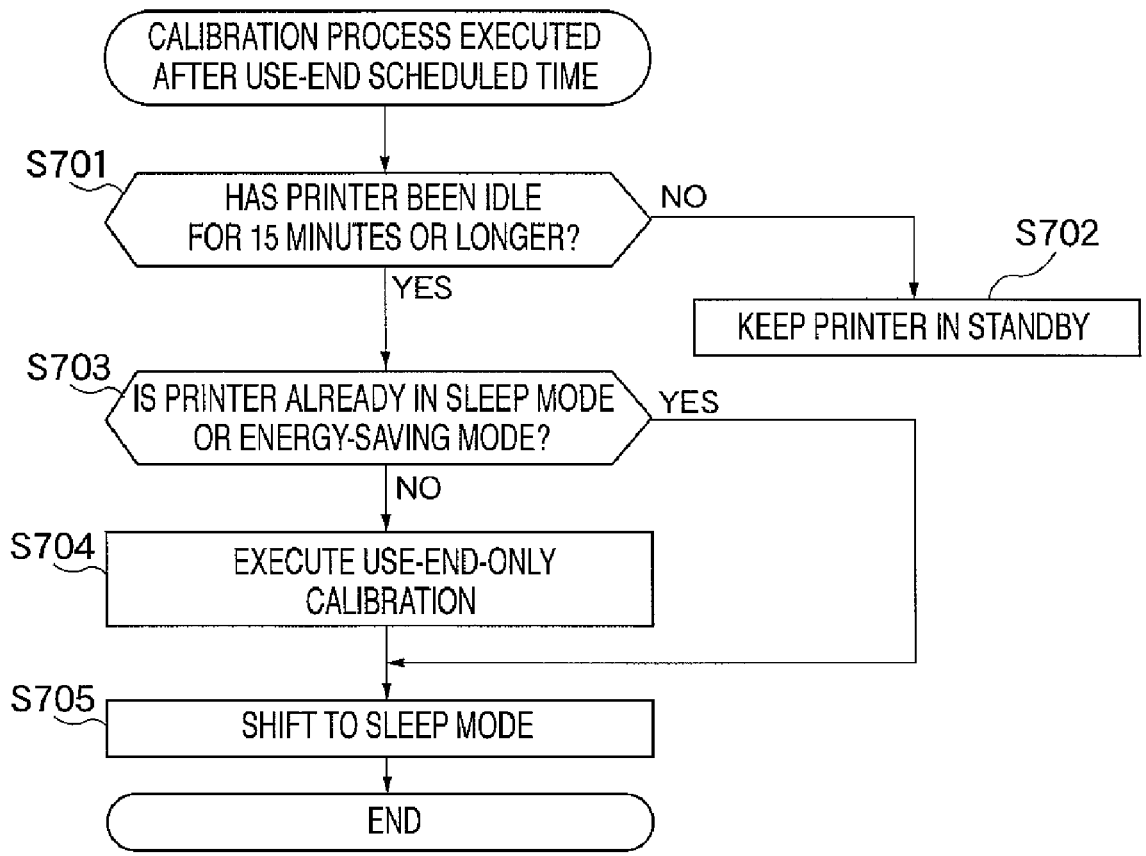
FIG. 7 is a flowchart of a calibration process executed by the FIG. 1 image forming apparatus, after a use-end scheduled time.

FIG. 7 is a flowchart of a calibration process executed by the FIG. 1 image forming apparatus, after the use-end scheduled time.

This process is executed by the printer controller 101 appearing in FIG. 1.

When the use-end scheduled time set by the user is approaching, the printer controller 101 recognizes the fact, and starts the present process.

In FIG. 7, it is determined whether or not the printer has been idle for 15 minutes or longer (step S701). If there is any use who has used the printer within 15 minutes from now, it is judged that there is a possibility that the user performs printing, so that the printer is kept in standby (step S702).

However, if it is determined in the step S701 that 15 minutes or longer have passed after the last user used the printer for printing, the process proceeds to a step S703, wherein it is determined whether or not the printer is already in the sleep mode or the energy-saving mode.

The energy-saving mode is provided for controlling the temperature of the fixing unit 223 which consumes power most of all component parts of the printer to a temperature lower than that for the standby state to thereby reduce the power required when the printer is standby for printing.

If it is determined in the step S703 that the printer has shifted to the sleep mode or the energy-saving mode, the process directly proceeds to a step S705 wherein the printer is placed in the sleep mode, followed by terminating the present program. In the sleep mode, only the power supply to the CPU and components necessary for monitoring for an instruction for activating the printer is kept on, but all the remaining power supply is turned off.

If it is determined in the step S703 that the printer has not yet shifted to the sleep mode or the energy-saving mode, the end-time-only calibration is executed (step S704), and then the process proceeds to the step S705 to cause the printer to shift to the sleep mode.

Figure 8:
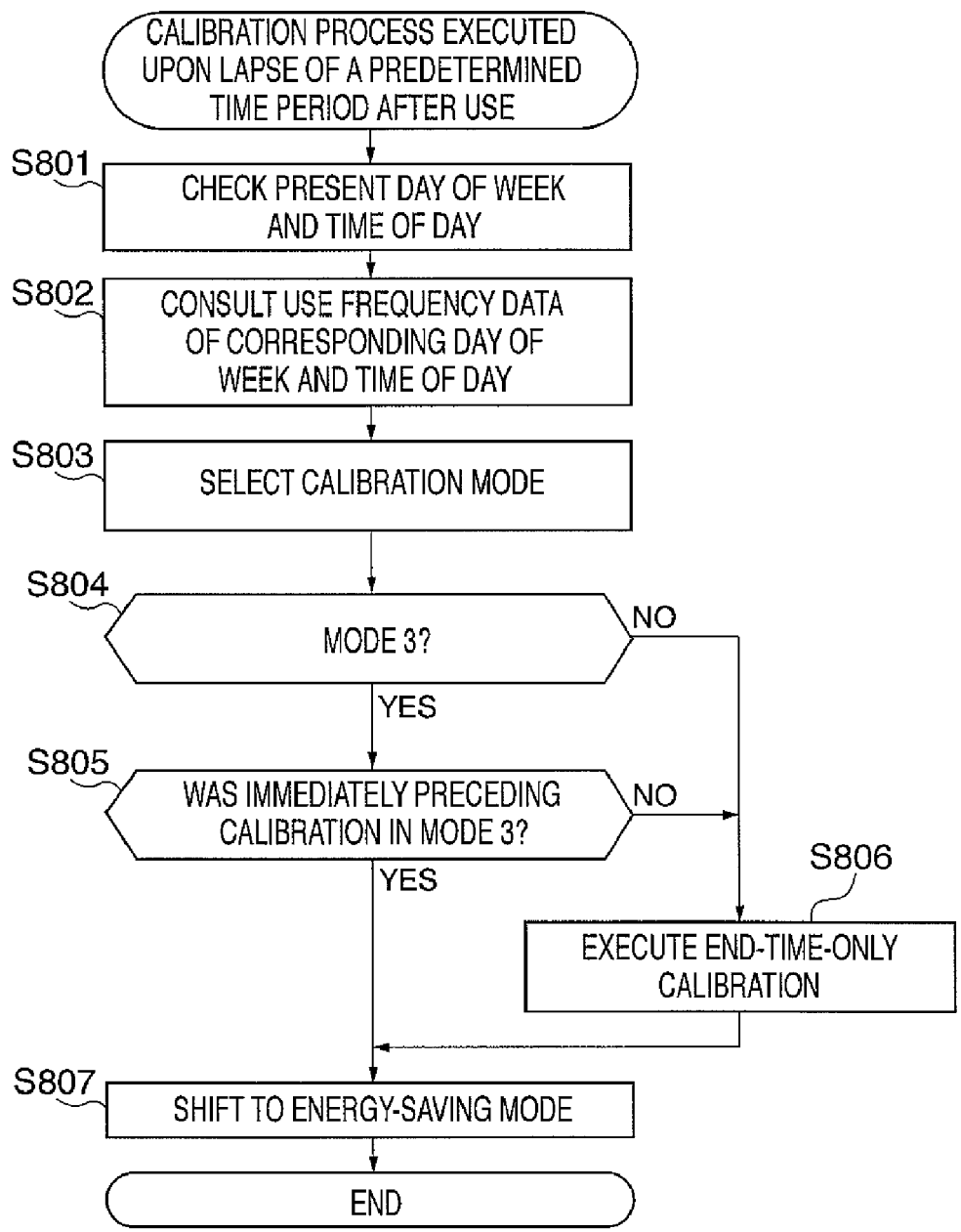
FIG. 8 is a flowchart of a calibration process executed by the FIG. 1 image forming apparatus, upon the lapse of a predetermined time period after the use thereof.

FIG. 8 is a flowchart of a calibration process executed by the FIG. 1 image forming apparatus, upon the lapse of a predetermined time period after use thereof.

This process is executed by the printer controller 101 appearing in FIG. 1.

The present process is started if there occurs a state in which the printer has been idle for 15 minutes or longer after the printing was executed last time in the range of service time.

In FIG. 8, first, the present day of week and time of day are checked (step S801). Based on the checked day of week and time of day, the use frequency data of the corresponding day of week and time of day stored in the hard disk 111 is consulted (step S802). Based on the consulted use frequency data, a calibration mode is selected (step S803). The calibration mode selected here corresponds to one of Mode 1, Mode 2 and Mode 3, described hereinbefore with reference to FIGS. 3 and 4.

Next, it is determined whether or not the calibration mode is Mode 3 (step S804). The reason for determining here whether or not the calibration mode is Mode 3 is that in Mode 3, the calibration is executed more precisely than in Mode 1 and Mode 2, and hence if the calibration is executed in Mode 3, it is possible to always maintain an appropriate quality of color printed images. This makes it unnecessary to execute the precise calibration until the printer shift to the energy-saving mode.

If it is determined in the step S804 that Mode 3 has been selected, then it is determined whether or not the calibration in Mode 3 was carried out immediately before (within one hour from now, in the present case) (step S805). This is because although the present calibration mode is Mode 3 in the present time zone, there can be a case of the calibration having been not executed.

If it is determined in the step S805 that the calibration in Mode 3 was executed, the printer is caused to shift to the energy-saving mode (step S807), followed by terminating the present process, whereas if not, the end-time-only calibration is executed (step S806).

Further, if it is determined in the step S804 the calibration mode is not Mode 3 as well, the end-time-only calibration is executed in the step S806, and then the printer is caused to shift to the energy-saving mode (step S807).

Although in the example illustrated in FIG. 8, the determination in the steps S804 and S805 is executed with reference to Mode 3, the determination may be made with reference to Mode 1 or Mode 2. Further, although the calibration executed before shifting to the energy-saving mode is set to the end-time-only calibration in the FIG. 8 example, it may be set to Mode 1, Mode 2 or Mode 3.

As described heretofore, when it is determined that it is necessary to execute the calibration before shifting to the sleep mode or the energy-saving mode in the range of service time, an appropriate calibration is executed whereby it is possible to maintain the printer always in the optimum state.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-277798 filed Oct. 11, 2006 which is hereby incorporated by reference herein in its entirety.

What is claimed is:

1. An image forming apparatus that has a plurality of calibration modes set in advance on a time-zone-by-time-zone basis for operating days, the image forming apparatus comprising:
a day-of-week/time-of-day determining unit that determines a present day of week and a present time of day;
a storing unit that stores use frequency data of said image forming apparatus on an hour-by-hour and day-of-week basis;
a selection unit that reads out, from said storing unit, the use frequency data corresponding to the present day of week and the present time of day determined by said day-of-week/time-of-day determining unit, and selects one of the calibration modes based on the read-out use frequency data;
a counting unit that performs cumulative counting of sheets subjected to color printing after a preceding calibration;
a calibration-execution determining unit that determines whether or not calibration in the calibration mode selected by said selection unit should be executed, from a cumulative count value of sheets subjected to color printing counted by said counting unit and the calibration mode selected by said selection unit; and
a calibration execution unit that executes the calibration in the calibration mode selected by said selection unit, in response to the determination by said calibration-execution determining unit that the calibration should be executed.

2. An image forming apparatus as claimed in claim 1, further comprising:
a standby-state determining unit that determines whether or not the image forming apparatus is in standby before a use-start scheduled time; and
a before-use-only calibration execution unit that executes the calibration in a before-use-only calibration mode when a predetermined time period elapses if the image forming apparatus is in standby before the use-start scheduled time.

3. An image forming apparatus as claimed in claim 1, further comprising:
an elapsed-time determining unit that determines whether or not a predetermined time period has elapsed after printing is executed last time, when it becomes a use-end scheduled time;
a sleep mode/energy-saving mode shift determining unit that determines whether or not the image forming apparatus has shifted to a sleep mode or an energy-saving mode, if the predetermined time period has elapsed;
a sleep mode/energy-saving mode execution unit that executes the sleep mode or the energy-saving mode if the image forming apparatus has shifted to the sleep mode or the energy-saving mode; and an end-time-only calibration execution unit that executes an end-time-only calibration if the image forming apparatus has not shifted to the sleep mode or the energy-saving mode.

4. An image forming apparatus as claimed in claim 3, further comprising:

a calibration rank-determining unit that determines whether or not the calibration selected after a predetermined time period has elapsed after use of the image forming apparatus is of a highest rank for maintaining an image quality;

an immediately preceding calibration-rank determining unit that determines whether or not the calibration mode of the calibration executed on an immediately preceding occasion is of the highest rank, if the calibration mode selected after the predetermined time period has elapsed after the use of the image forming apparatus is of the highest rank; and a control unit that causes the end-time-only calibration execution unit to execute the end-time-only calibration if the calibration mode selected after the predetermined time period has elapsed after the use of the image forming apparatus is not of the highest rank, and causes the sleep mode/energy-saving mode execution unit to execute the sleep mode or the energy-saving mode, if the calibration mode selected after the predetermined time period has elapsed after the use of the image forming apparatus is of the highest rank and the preceding calibration is also of the highest rank.

* * * * *